United States Patent Office 3,256,690
Patented June 21, 1966

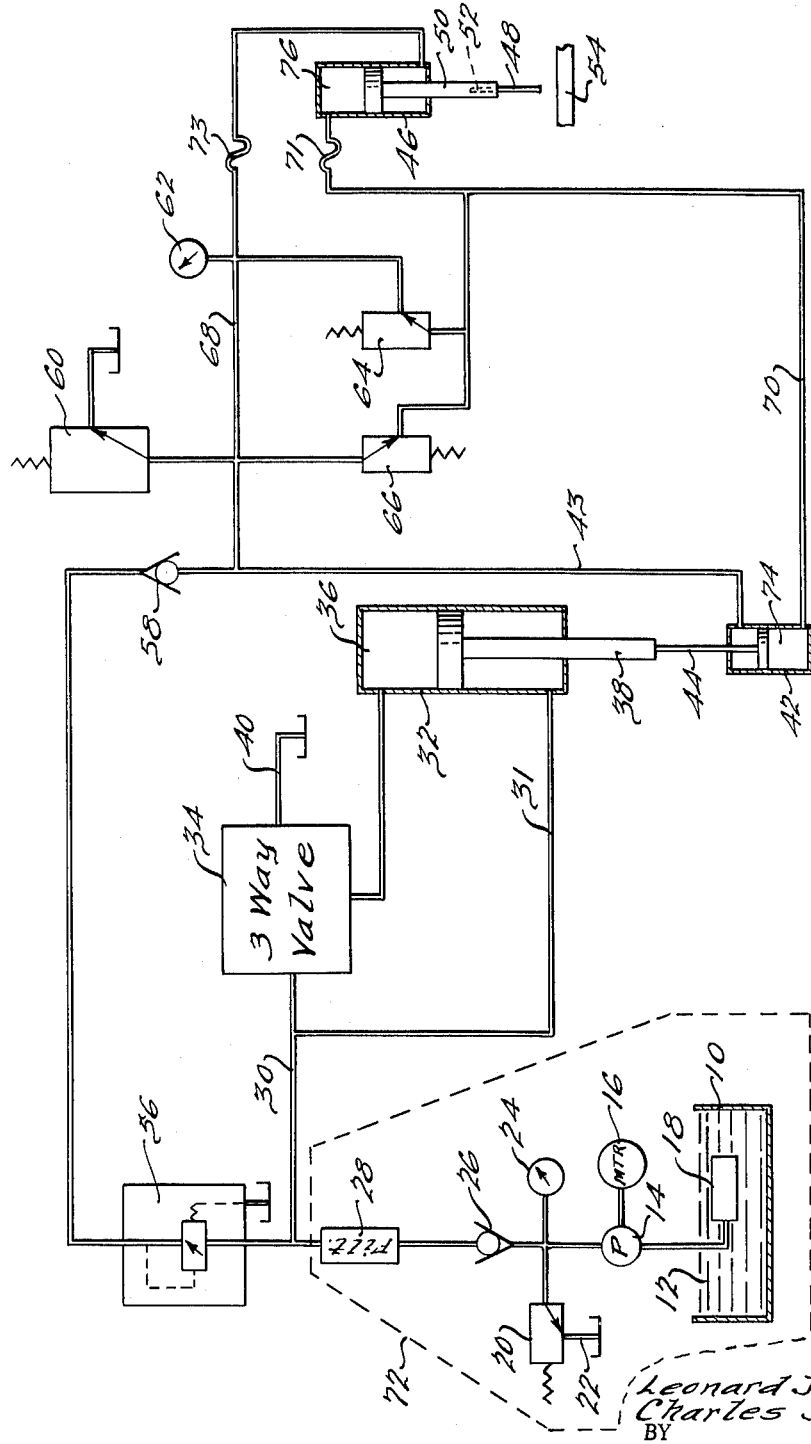

3,256,690
SERVO SYSTEM
Leonard J. Smith, Berkley, and Charles J. Pryor, Clawson, Mich., assignors to Elox Corporation of Michigan, Troy, Mich., a corporation of Michigan
Filed Nov. 21, 1961, Ser. No. 153,966
5 Claims. (Cl. 60—54.5)

This invention relates to automatic hydraulic servo systems, particularly to a remotely operated servo actuator.

Modern day tooling, high-speed aircraft, missiles and new specialized machine structures have produced a need for small, portable, high performance, servo actuators. A specific example is in the field of Electrical Discharge Machining.

Electrical Discharge Machining, sometimes referred to in the art as EDM, spark machining, or arc machining, is carried on by passing a series of discrete, localized, extremely high current density discharges across a gap between a tool electrode and a conductive workpiece at sonic or ultrasonic frequencies in the presence of a dielectric fluid for eroding the workpiece.

An example of a machining power circuit for such equipment is shown in Matulaitis Patent No. 2,951,969, issued September 6, 1960. An example of automatic servo feed circuitry for controlling the position of the electrode is shown in Webb Patent No. 2,962,630, issued November 29, 1960.

The machining of accurate shapes by electrical discharge in areas difficult to reach with conventional servo operators has introduced problems requiring special solutions. Attempts to use miniature fluid actuators for feeding and controlling the position of the machining electrode have been generally unsuccessful because commercially available valves, pumps and other equipment for fluid servo systems are designed for systems utilizing higher pressures and higher rates of fluid flow than are usable with a miniature actuator.

The smallest commercially available servo valves and hydraulic servo systems utilize fluid flows of a minimum of approximately 1 gallon per minute at pressures of 1000 p.s.i. or more. It has been found that for proper operation, a miniature servo actuator of the type herein described, must be limited in speed to approximately three inches per minute of lineal feed. For such a miniature servo actuator having a net piston area of one-half square inch, this requires controlled fluid pressure of 1.5 cubic inches per minute flow or approximately $\frac{1}{200}$ of present commercially available systems.

Accordingly, it is the principal object of this invention to provide a miniature remotely controlled servo actuator and means for adapting a relatively high capacity fluid flow system of the type commercially available to this miniature actuator.

Another object of this invention is to provide a novel system for producing low pressure controlled hydraulic power from a high pressure system.

Another object of this invention is to provide an automatic pressure limiting system and position resetting mechanism for a remotely controlled servo actuator.

Still another object is to show means whereby a standard large actuator and high flow system may be adapted to a miniature system thus permitting use of either system.

Other objects and advantages are disclosed in the following specification, which taken in conjunction with the accompanying drawing, show a preferred form of practicing the invention.

In the drawing in which reference numerals have been used to designate like parts herein referred to an example of the invention is shown in schematic form.

Referring now to the drawing, fluid reservoir 10 contains hydraulic fluid 12. A pump 14, driven by motor 16, draws hydraulic fluid through strainer 18 thereby producing high pressure hydraulic fluid. A pressure relief valve 20 is provided in the output line of the pressure pump for limiting the output pressure of the hydraulic power pack and the excess fluid relieved through this valve is returned to the tank through line 22. A pressure gauge 24 is provided to indicate the operating level of the high pressure system. A check valve 26 is provided in the output of the pressure pump to prevent back leakage or surges through the pump during periods when the system is turned off and to prevent all of the lines and other fluid containing members from draining and thereby entrapping gas. A filter 28 is installed in the pressure line just before the various control elements to provide contamination free fluid to the system.

A pressure line 30 connects to the input of a servo valve 34 which in this instance is connected to operate as a three-way servo valve for controlling a single rod cylinder 32. Pressure line 30 also connects to the rod end of cylinder 32 through branch 31. Servo valve 34 controls fluid pressure distribution to the control end of cylinder 32 by alternately connecting chamber 36 of the cylinder to pressure line 30 to produce a downstroke of rod 38 or to tank return 40 to produce an upstroke.

This portion of the system is presently well known in the hydraulic servo control industry and a system similar to this portion of the present invention is shown in the above mentioned Patent No. 2,962,630.

The present invention is concerned with producing accurately controlled small volume changes for proper positioning of the miniature servo actuator from this rather large commercially available hydraulic system. The relatively large area cylinder 32 is connected to a small control cylinder 42 by a direct mechanical connection between the larger piston rod 38 and the smaller piston rod 44 of the small control cylinder. The fluid output from each end of control cylinder 42 is coupled to corresponding ends of the miniature servo actuator 46.

In this example, the EDM electrode 48 is insulated from cylinder rod 50 by an insulated connector 52 of suitable form. Cylinder 46 is mounted rigidly in the proper relationship to workpiece 54 so that machining may proceed as outlined in the above mentioned patents.

In this particular example, relatively low pressure hydraulic fluid is developed from the main high pressure system by means of a pressure reducing valve 56. The output of pressure reducing valve 56 is connected through a check valve 58 to the rod ends of both the control cylinder 42 and the miniature actuator 46 through conduits 43 and 68 respectively. A pressure relief valve 60 is provided to relieve undesirably high pressure from the miniature system since back flow from this system is blocked by check valve 58. A pressure gauge 62 is provided to indicate the operating pressure of the miniature system. Relief valves 64 and 66 of the check valve type are provided to relieve excess pressure from one end of the servo actuator to the other, as will be described. The hydraulic lines 68 and 70 which connect to the miniature servo actuator are provided with flexible hose sections 71, 73, so that it may be readily moved about and easily placed in the difficult to reach areas where this servo actuator is used.

Operation of the system is as follows: Filtered high pressure fluid is developed by power pack 72 as previously described and furnished to the rod end of cylinder 32 and servo valve 34. The system is phased such that downfeed of rod 38 produces downfeed of the output servo actuator rod 50. Downfeed of rod 38 is produced by servo valve 34 connecting chamber 36 to pressure line 30. Since the pressure at that instant is equal in the top and bottom portions of cylinder 32, a downward differential force equal to the pressure times the area of rod 38 results thereby forcing rod 38 downward. Retraction of rod 38 and therefore rod 44 and 50 is produced when servo valve 34 connects chamber 36 of cylinder 32 to tank return line 40. In this condition of back-up, chamber 36 is at low pressure and rod 38 is forced upward by fluid flow from pressure line 31.

Downward motion of rods 38 and 44 forces fluid from chamber 74 of the control actuator to chamber 76 of the servo actuator. This resulting fluid flow and increased pressure produces downfeed of rod 50 and therefore of electrode 48.

As a condition of back-up is called for, rod 38 retracts, drawing fluid into chamber 74 of cylinder 42 and out of chamber 76 of the servo actuator thereby producing back-up of electrode 48.

Control cylinder 42 and servo actuator 46 are usually though not necessarily of the same piston area. Different relative feed rates may be achieved by having different piston areas for the miniature cylinders 42 and 46.

One problem that occurs in prior art systems of this type is the lack of positive correspondence between the positon of rod 44 of the control or master cylinder 42 and rod 50 of the load actuator or slave 46. Since the only coupling is through the hydraulic lines, unequal hydraulic leakage through one or the other of these cylinders may cause them to get out-of-step and necessarily the strokes of the two cylinders cannot be matched exactly. Also, output rod 50 may become jammed for some external reason and therefore pressure relief devices must be provided.

Power pack 72 operates typically at approximately 1000 p.s.i. and the servo valve 34 requires a pressure of approximately this magnitude to operate properly. If the area difference between control cylinder 42 and cylinder 32 is approximately 200 to 1 as described above, this could result theoretically in pressures within cylinder 42 in the order of 200,000 p.s.i. and certainly would cause rupture of one of the smaller cylinders or the pressure lines.

As stated above, fluid pressure is reduced through pressure reducing valve 56 and furnished to the miniature system through check valve 58. Pressure relief valve 60 is provided to vent excess pressure from the miniature system that may result from bottoming at either end of stroke or a jammed output rod.

Excess pressure may be caused in line 70 by jamming of rod 50 or by rod 50 reaching the bottom of its downward stroke before rod 44 of the control cylinder. In this event, control rod 44 would continue to be forced downward producing excess pressure in chamber 74 and line 70. Relief valve 64 discharges this excessive pressure from line 70 to line 68. This effectively vents one end of cylinder 42 to the other end thereby producing a circulating fluid flow until rod 44 reaches the end of its stroke. During this operation, a slight amount of excess fluid may enter through check valve 58 and subsequently be discharged through relief valve 60.

During opposite stroke, if rod 50 of the servo actuator reaches the limit of its upward stroke before rod 44 of the control cylinder, cavitation would result in line 70 resulting in undesirable loss of fluid from the system. Accordingly, relief valve 66 is connected in opposite phasing to valve 64 to relieve fluid in this direction of motion thereby connecting the top of cylinder 42 to the bottom and protecting it against undesirable cavitaton. Normally there is some amount of positive pressure in chambers 76 and 74 and valve 66 is set to operate at the minimum desired positive pressure of these chambers.

During normal servo operation, excess pressure should not develop in either line and therefore relief valves 60, 64 and 66 are all closed. In the closed position, they do not interfere with normal servo operation.

At the end of a normal machining cycle, electrode 48 is automatically retracted by rod 50 to the full limit of stroke through operation of the automatic power feed control of the machine tool (not shown here), and through operation of relief valve 66, rod 44 continues upward to the end of its stroke; thereby automatically resetting or correctly phasing the two cylinders for subsequent operation. If the rod 50 is not fully retracted when the rod 44 reaches the upper end of its stroke, the two may be synchronized upon resumption of operation of the machine by causing the rod 44 to bottom at both the lower and upper ends of its stroke. This operation, preferably by manual control of the operator, through a complete up and down stroke will, through operation of the relief valves 64 and 66, bring the rods 44 and 50 into phase. In this manner, positive phasing control is achieved between the two cylinders even though connected only by fluid lines.

Thus it can be seen that we have shown and described an automatic remotely controlled miniature servo actuator system that may be readily adapted to commercially available high flow hydraulic systems and may be actuated by a standard, large, high pressure system and servo actuator of the same type. By so doing, it is not intended to limit the scope of the invention to the above disclosure which is given for purpose of example but only as set forth in the following claims.

We claim:

1. In a remote control, fluid operated servo system including a source of constant pressure fluid, a high flow servo valve actuated, relatively large area operator cylinder and piston, a low flow master cylinder having a piston of substantially smaller operating area mechanically connected to said operator piston, a slave cylinder and piston, a first conduit means for connecting the first respective ends of said master and slave cylinders to said source and to each other, conduit means connecting the other respective ends of said slave and master cylinders to provide movement of said slave piston responsive to movement of said master piston, and a pair of oppositely phased check valves connected in common across the end chambers of each of said master and slave cylinders to provide synchronizing movement of said master piston responsive to stoppage of said slave piston before bottoming of said master piston.

2. In a remote control, fluid operated servo system including a source of constant pressure fluid, a high flow servo valve actuated, relatively large area operator cylinder and piston, a low flow master cylinder having a piston of substantially smaller operating area mechanically connected to said operator piston, a slave cylinder and piston, a first conduit connected between one pair of corresponding ends of said master and slave cylinders and to said source, a second conduit connected between the other pair of corresponding ends of said master and slave cylinders, a pair of oppositely phased check valves connected across said first and second conduits to provide synchronizing movement of said master piston responsive to stoppage of said slave piston before bottoming of said master piston, and a pressure relief valve operatively connected to said oppositely phased check valves for venting excessive pressure resulting from said bottoming.

3. The combination as set forth in claim 2 in which said master and slave pistons have substantially equal area operating surfaces to provide equivalent rates of movement.

4. The combination as set forth in claim 2 in which said master and slave pistons have different area operating surfaces to provide predetermined relative feed rates.

5. The combination as set forth in claim 2 in which said fluid from said source is of a relatively high pressure and a pressure reducing valve is connected between said source and said master and slave cylinders for furnishing fluid pressure thereto to compensate for loss of fluid therein.

(References on following page)

References Cited by the Examiner

UNITED STATES PATENTS

| | | | |
|---|---|---|---|
| 1,802,790 | 4/1931 | Squires | 60—54.5 |
| 1,914,267 | 6/1933 | Leupold | 60—54.5 X |
| 2,265,987 | 12/1941 | Anderson et al. | 60—54.5 X |
| 2,292,916 | 8/1942 | Wheelon | 60—54.6 |
| 2,380,575 | 7/1945 | Brown | 60—54.5 |
| 2,403,325 | 7/1946 | Armington | 60—54.5 X |
| 2,743,582 | 5/1956 | Wiedmann | 60—54.5 X |
| 2,978,044 | 4/1961 | Baines | 60—54.5 X |

SAMUEL LEVINE, *Primary Examiner.*

ROBERT R. BUNEVICH, *Examiner.*